UNITED STATES PATENT OFFICE.

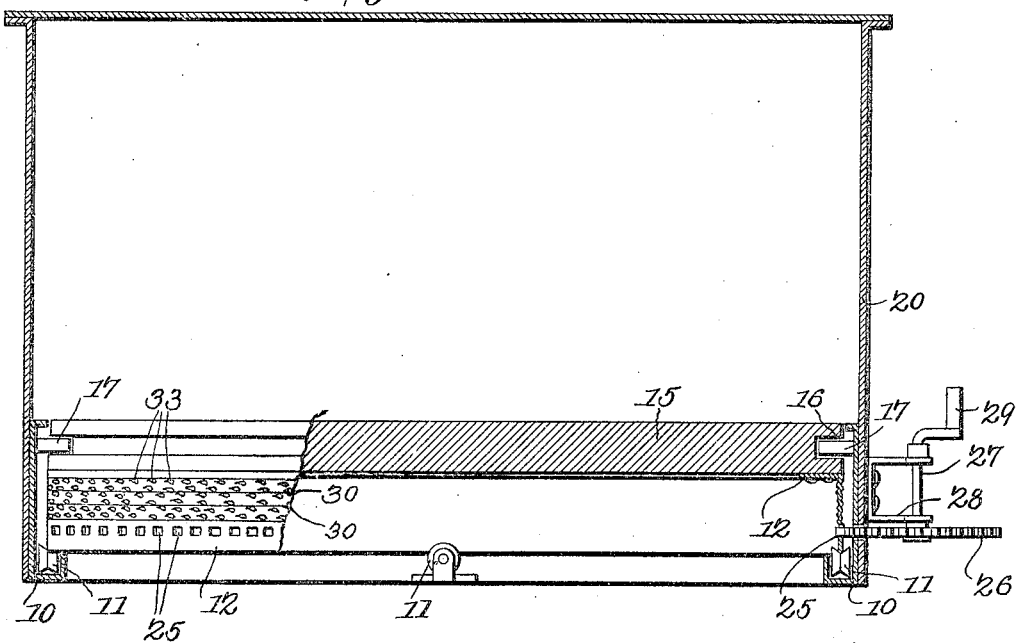
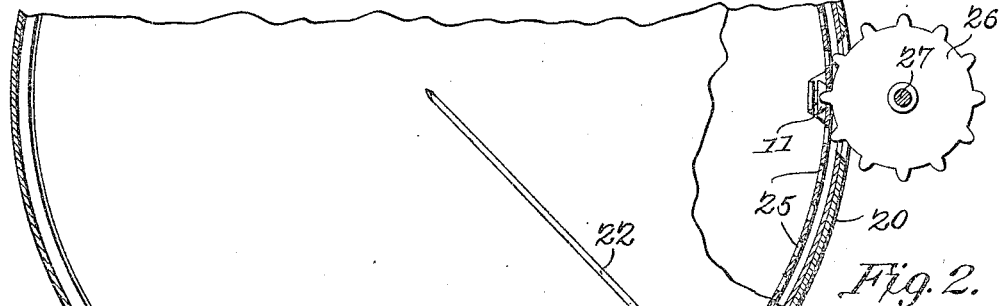
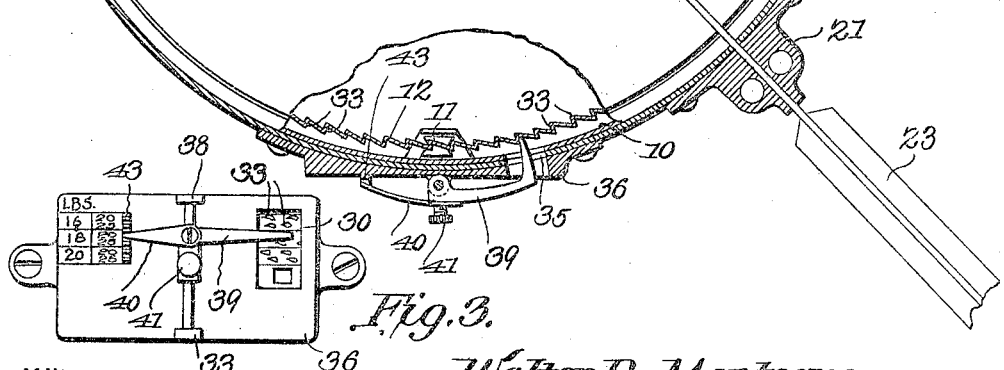

WALTER R. MONTGOMERY, OF SHREVEPORT, LOUISIANA.

CHEESE-CUTTER.

No. 804,153.     Specification of Letters Patent.     Patented Nov. 7, 1905.

Application filed April 7, 1905. Serial No. 254,359.

*To all whom it may concern:*

Be it known that I, WALTER R. MONTGOMERY, a citizen of the United States, residing at Shreveport, in the parish of Caddo and State of Louisiana, have invented a new and useful Cheese-Cutter, of which the following is a specification.

This invention relates to cheese-cutters, and has for its principal object to provide a device of very simple construction whereby a given weight or given value of cheese may be accurately cut.

A further object of the invention is to provide a novel form of calculating means by which cheese of different weights may be accurately subdivided, the cheese being first weighed as a whole and thence placed on the cutter-board of the mechanism, after which the computing device is adjusted to correspond to the weight and the price per pound, the object being to permit the merchant to cut a given value of cheese—for instance, five cents' worth or ten cents' worth—from a cheese of any weight and any value.

A still further object of the invention is to provide a device of this character in which the computing mechanism serves in part as a means for stopping the movement of the cutter-board and retaining the same in the proper position for cutting a segment of predetermined size.

A still further object of the invention is to provide a computing mechanism in which close observation of the mechanism will be unnecessary, the arrival of the cutter-board in the proper position being audibly announced and the parts held in any desired position until after the cutting operation.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a sectional elevation of a cheese-cutter constructed in accordance with the invention. Fig. 2 is a sectional plan view of a portion of the same. Fig. 3 is a side elevation of a portion of the computing mechanism.

Similar numerals of reference are employed to indicate corresponding parts throughout the several figures of the drawings.

The cutter-board and casing are supported by a base-ring 10, that is provided at intervals with bearings for the support of a plurality of antifriction-rollers 11, the peripheries of which are grooved for the reception of the lower edge of a computing-ring 12, that is rigidly secured to the lower face of a cutter-board 15. The periphery of the cutter-board has an annular groove 16 for the reception of pins or antifriction-rollers 17, that are carried by the vertical wall of the base-ring and prevent vertical displacement of the cutter-board.

The apparatus is provided with a suitable casing 20 and has a standard 21, provided with supports for a suitable cutting-knife 22, the blade of which extends in a line radial of the board and is provided with a suitable operating-handle 23 at a point outside the casing.

The computing-ring 12 is provided with an annular rack 25, with which engages a pinion 26, that is carried by a vertical arbor 27, supported in bearings in a bracket 28, that projects from the main casing, and to the upper end of the arbor is secured an operating-crank 29, which may be manipulated for the purpose of turning the ring 12 and the cutter-board, so that the cheese may be brought to cutting position.

The outer face of the ring 12 is divided by parallel lines 30 into as many horizontal parallel spaces as there are weights of cheese to be cut, three of such spaces being shown in the present instance and these corresponding to cakes of sixteen, eighteen, and twenty pounds, respectively; but the number may be increased to any extent, and the weights may be altered as required. Each of the computing-spaces separated by the horizontal lines 30 is provided with two or more series of notches or indentations 33, two annular rows of indentations being shown in the present instance, said rows being parallel with each other and those of the upper row being spaced at greater distance from each other than those of the lower row. The number of rows of indentations and the distance between the indentations of each row are governed by the price per pound of cheese, and on reference to Fig. 3 it will be seen that for a cheese valued at twenty cents per pound the indentations are spaced farther from each other than for a cheese valued at twenty-five cents per pound.

The casing is provided with an opening 35, and to the front of the casing is secured a plate 36, bearing numerals corresponding to the weights and values of the cheese and provided with an opening in alinement with the opening 35, these openings serving to display the indentations 33 of the computing-ring 12. The plate 36 is provided with a pair of lugs or ears 38, on which is mounted a vertically-adjustable pawl 39, having one end turned and pointed to engage in any one of the rows of indentations, while the opposite end is in the form of a pointer 40, that is moved into horizontal alinement with the tables at the left of the plate, indicating the weights of cheese and the value of cheese per pound. The pawl may be adjusted vertically and locked in position by a suitable set-screw 41, this being accomplished each time a new cheese is placed in position, the first rough adjusting being in the presenting of the pointer opposite the weight of the cheese—eighteen pounds in the present instance—and the second adjustment to place the pointer opposite the value per pound—twenty cents in the instance shown in Fig. 3. This places the pointed end of the pawl in alinement with the upper row of indentations formed in the second computing-space, and these indentations are spaced from each other for a distance corresponding to predetermined values of cheese. For instance, the space between each two indentations may correspond to the size of a segment of cheese valued at five cents, and by turning the crank 29 the merchant may rotate the cutter-board until the pawl 39 has clicked into one or two or three indentations should the customer wish five, ten, or fifteen cents' worth of cheese, and, as the sound is audible, there is no necessity for close observation of the computing mechanism. When the desired adjustment has been reached, the pawl remains in the last indentation, and the cheese has then moved beyond the knife to an extent corresponding exactly to the arcuate distance traveled by the computing-ring. The pointer 40 acts as a spring for holding the pawl in engagement with the computing-ring, and the teeth or indentations of the latter are preferably ratchet-like in form to permit ready movement past the pawl. The plate 36 is provided with a number of ribs and notches 43 for holding the pointer in adjusted position, as shown in Fig. 3.

With a device of this class it is possible to very accurately measure segments of cheese of different values.

Having thus described the invention, what is claimed is—

1. The combination in a cheese-cutter, of a cutter-board mounted for revoluble movement in a horizontal plane, a ring secured thereto and provided with a plurality of horizontal rows of ratchet-teeth, the teeth of the different rows being of different pitch, respectively, a vertically-adjustable pawl arranged to engage with said teeth and permitting free movement of the cutter-board in one direction, and locking said board from movement in the opposite direction.

2. The combination in a cheese-cutter, of a cutter-board, a ring secured thereto and provided with a plurality of horizontal rows of teeth or indentations, the indentations of the different rows being of different pitch, respectively, a computing-table in alinement with the several rows, and a vertically-adjustable pawl arranged to engage with any one of the rows of indentations and having a pointer movable into alinement with said computing-table.

3. The combination with a revoluble cutter-board, of a computing means carried thereby and provided with a plurality of horizontal rows of indentations, the indentations of the respective rows being of different pitch, a stationary weight and rate table alined with the rows of indentations, a pivot-rod, and a pawl adjustable vertically of the rod for engagement with any row of indentations.

4. The combination with a revoluble cutter-board, of a computing-ring carried thereby and provided with a plurality of horizontal rows of indentations, the indentations of the respective rows being of different pitch, said rows being divided into groups, each group corresponding to a predetermined weight of cheese to be subdivided, and the rows constituting each group representing different rate values, a stationary weight and rate table in alinement with the rows, a vertical pivot-pin, a pawl adjustable thereon to a position in alinement with any one of the rows, means for locking the pawl in adjusted position, and a pointer movable with the pawl and serving as a spring for forcing the latter into the indentations.

5. The combination with a revoluble cutter-board, of a computing-ring carried thereby and provided with a plurality of horizontal rows of indentations, the indentations of the different rows being of different pitch respectively, a stationary ring, and a plate supported thereby, said ring and plate having openings to expose the rows of indentations, weight and rate tables carried by the plate in horizontal alinement with the rows of indentations, pivot-brackets carried by the plate, a vertically-disposed pivot-pin supported by the bracket, a pawl adjustable on the pivot-pin, means for locking the pawl in its adjusted position, a pointer carried by the pawl and serving as a spring for holding said pawl in the indentations, said plate having ribs and grooves for engagement with the end of the pointer.

In testimony that I claim the foregoing as my own I have hereto affixed my signature in the presence of two witnesses.

WALTER R. MONTGOMERY.

Witnesses:
J. H. JOCHUM, Jr.,
W. J. DILLON.